United States Patent [19]
Zabel, Jr.

[11] Patent Number: 4,462,449
[45] Date of Patent: Jul. 31, 1984

[54] VALVE CORE FOR PNEUMATIC TIRES

[76] Inventor: John H. Zabel, Jr., 10 Greenhill Dr., Rte. 2, Simpsonville, S.C. 29681

[21] Appl. No.: 344,981

[22] Filed: Feb. 2, 1982

[51] Int. Cl.³ .............................................. B60C 23/10
[52] U.S. Cl. ............................ 152/429; 152/DIG. 11; 137/223; 137/234.5
[58] Field of Search ............................ 137/223, 234.5; 152/DIG. 11, 415, 427, 428

[56] References Cited
U.S. PATENT DOCUMENTS

| | | | |
|---|---|---|---|
| 623,029 | 4/1899 | McCollum | 137/223 X |
| 2,095,912 | 10/1937 | Boyd | 137/223 |
| 2,231,449 | 2/1941 | Keefe | 137/223 |
| 2,236,587 | 4/1941 | Williams | 137/223 |
| 2,240,096 | 4/1941 | Gora | 137/223 |
| 3,007,483 | 11/1961 | Keefe | 137/223 |
| 3,465,780 | 9/1969 | Duymelinck | 137/234.5 |
| 3,496,969 | 2/1970 | Bruce | 137/223 X |

Primary Examiner—Harold W. Weakley
Attorney, Agent, or Firm—Bailey & Hardaway

[57] ABSTRACT

A novel valve mechanism is disclosed which eliminates the need for a conventional cap normally associated with prior art valve and valve stem assemblies for pneumatic tires. The valve stem embodies a core with an elastomeric member to prevent ingress and egress of a fluid through the valve stem. The elastomeric member can be a normally collapsed flexible tube or a resealable septa.

10 Claims, 6 Drawing Figures

VALVE CORE FOR PNEUMATIC TIRES

BACKGROUND OF THE INVENTION

This invention relates generally to the art of automobile and truck tires and relates more particularly to a novel valve assembly therefor.

Within the trucking industry alone significant sums are expended for the sole purpose of maintaining vehicle tires at a safe operating pressure. Conventional valve assemblies permit sufficient egress of a pressurized fluid from pneumatic tires to make it mandatory to spend significant personnel time measuring and maintaining safe tire pressure. This problem is exacerbated by the tendency of maintenance personnel and mechanics in general to neglect replacement of end caps, adapted to seal the internal portion of the valve stems from exposure to atmosphere and environmental soil. With the absence of such end caps road soil enters the conventional cores of such mechanisms to impair the normal operation thereof. The presence of environmental soil increases leakage through the valve assembly and further increases the expenses associated with the maintenance of appropriate pressures within truck tires.

Similar problems are associated with automobile tires, but not to the same extent experienced in the trucking industry. Various prior art valves and valve assemblies have attempted to overcome the problems associated with leakage through the valve stem assemblies.

U.S. Pat. No. 2,311,748 to Gora discloses a valve assembly wherein a tapered valve closure rests within a mating seat. U.S. Pat. No. 2,309,430 to Albert discloses a similar structure which does not call for the use of a cap. U.S. Pat. No. 2,255,932 to Kraft et al. describe various valve stems with particular emphasis being placed on the terminal communication between the valve stem and the high pressure area. U.S. Pat. No. 3,456,676 also discloses a valve assembly which does not call for a closure cap.

U.S. Pat. No. 2,128,623 describes a valve stem assembly with particular emphasis on preventing the accumulation a foreign matter within the valve core.

U.S. Pat. Nos. 2,236,587 to Williams, 2,218,623 to Stuck and U.S. Pat. No. 2,749,931 to Battin disclose additional valve structures.

Other patents not directed to the tire art describe flexible closures for the separation of high pressure areas from low pressure areas. U.S. Pat. Nos. 2,734,308 and 2,802,608 to Gassaway are two such patents. Additional flexible closure means are described in U.S. Pat. No. 2,977,973 to Chakine and U.S. Pat. No. 3,517,682 to Smith.

SUMMARY OF THE INVENTION

It is thus an object of this invention to provide a novel core for a valve stem which does not require the presence of an end cap.

It is a further object of this invention to provide such a core which requires substantially less maintenance than prior art devices.

It is still a further and more particular object of this invention to provide a novel core having the ability to prevent leakage of any significance from a vehicle tire.

These as well as other objects are accomplished by a core for a valve stem and the combination thereof utilizing an elastomeric member to normally prevent fluid communication between the exterior environment and the high pressure area existing in the pneumatic tire.

DETAILED DESCRIPTION

In accordance with this invention it has been found that an elastomeric membrane may be utilized to establish a valve system between a high pressure area and a low pressure area and to permit selective fluid communication between the high pressure and low pressure areas on a desired basis, but while being substantially unaffected by contaminants which may be present from the surrounding environment. More particularly this invention uses elastomeric membranes within the environment of vehicle tires which are substantially resistant to road soil which tends to enter and foul existing prior art valve stems and valve mechanisms associated therewith. Various other advantages will be apparant from the following description with reference to the various figures of drawings.

As used in this disclosure the terminal elastomeric membrane is used in a generic sense to indicate a hollow flexible tubing which is normally in a collapsed state or a penetrable and resealable septa material of the type described in U.S. Pat. Nos. 4,300,614; 4,284,742; 4,256,158; 4,237,952; 4,216,812; and 4,213,491, which are herewith incorporated by reference. These distinctions will become more apparant from the following description of the various species existing within the generic scope of the invention.

Figure 1:
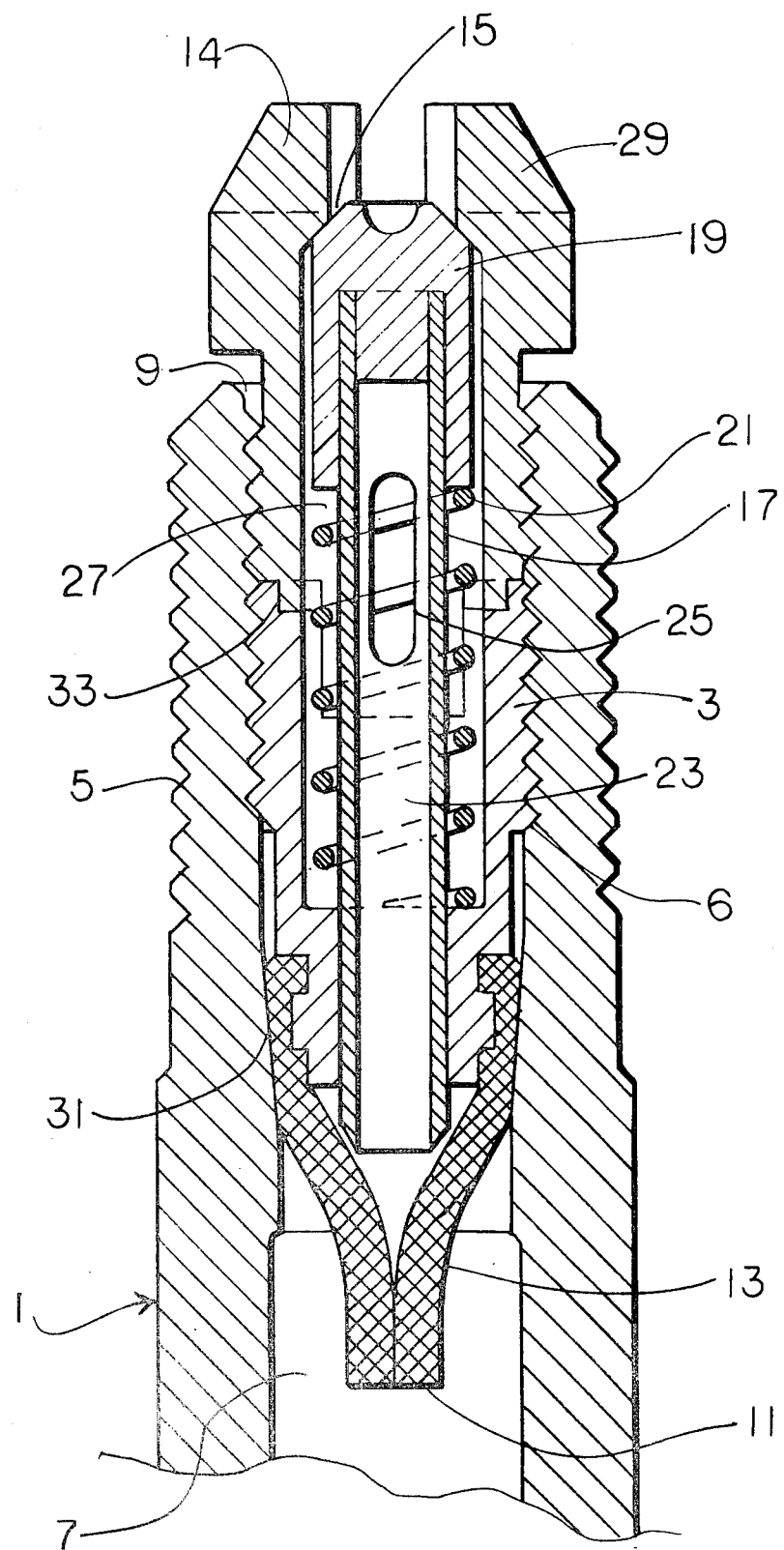
FIG. 1 of the drawings illustrates in cross section a valve stem and core in accordance with this invention.

FIG. 1 of the drawings depicts in cross section a valve stem embodying a valve mechanism in accordance with this invention. The FIG. 1 view is directed to the embodiment wherein the elastomeric membrane is a normally collapsed hollow tubing. FIG. 1 depicts a valve stem 1 which may be similar to conventional prior art valve stem with the core 3 possessing the novelty in accordance with this invention. However, since it is contemplated that the completed valve stem 1 and core 3 of this invention will not utilize a cap as is customary, the threads 5 illustrated in FIG. 1 may be dispensed with on valve stems embodying the core 3 in accordance with this invention.

For purposes of reference the valve stem 1 communicates through its hollow central portion 7 with a high pressure area such as the inner portion of automobile and truck tires either of the tubeless or tubed varieties. The other end 9 of stem 1 would in the absence of core 3 communicate with the exterior atmosphere or low pressure area.

The essence of this invention is embodied within the core 3. Core 3 comprises a proximal end 11 which is generally in communication with the high pressure area and a distal end 14 generally adjacent the low pressure area. The distal end 14 defines a distal end opening 15 which normally communicates with a low pressure area, but which also provides communication with a source of pressurized fluid, e.g., air, so as to provide means for replenishing the fluid within the high pressure area as is needed.

Figure 2:
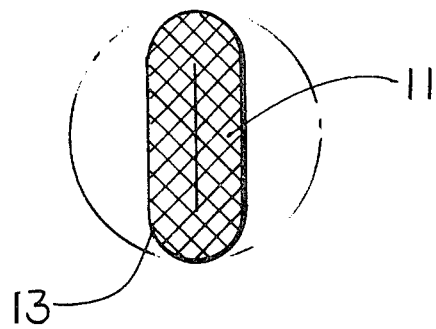
FIG. 2 of the drawings is a partial end view of the lower portion of FIG. 1.

The essential component of the FIG. 1 embodiment is the elastomeric member 13 which forms the proximal end 11 of core 3. The FIG. 1 embodiment illustrates elastomeric material 13 in the form of a flexible tube which is normally in a collapsed state to prevent egress of pressurized fluid from the high pressure area. This is best illustrated in FIG. 2 which is an end view across proximal end 11 of elastomeric material 13.

The elastomeric material is desirably formed in the collapsed state and expanded so as to mate with the hollow cylindrical body portion 16 of core 3. However, such material may be heat pressed to the configuration shown in FIGS. 1 an 2. Such elastomeric material may be of any of the well known materials on the market such as styrene butadine rubber and may be of a type sold under the tradename BUNA-N.

As is apparent the elastomeric material 13 is sufficient by itself to preclude egress of fluid from the high pressure end 7 of stem 1 through distal end opening 15. However, it is preferred to include within the core 3 additional closure means to further assure non-leakage. For this reason, needle 17 having a head portion 19 is included within the core 3. Head portion 19 mates with and is larger than distal end opening 15 to preclude fluid communication between the high pressure area and the low pressure area due to the biasing of the head portion by spring means 21 of the head portion toward distal end opening 15.

Preferably, needle 17 is hollow 23 in the non-head area and defines at least one orifice 25 into the hollow 27 of core. 3. When head portion 19 is moved downwardly from the position shown in FIG. 1 fluid communication is established between the exterior environment through distal end openining 15 over head portion 19 into hollow 27 through orifice 25 into the hollow 23 of needle 17 and ultimately to elastomeric member 13 at the proximal end 11 of core 3.

It is thus seen that when distal end opening 15 is placed in communication with a source of pressurized fluid which is at a greater pressure than the high pressure area in communication with area 7 that there will be a flow through the path just defined and through the generally collapsed tubular form of elastomeric member 13; with the increased pressure on the otherwise low pressure end causing the opening of the otherwise normally collapsed tubular form of flexible member 13. While permitting fluid communication when communication with a source of highly pressurized fluid such as the normal inflation means and coupling associated with the inflation of tires, no fluid communication is established in the opposite direction as long as the high pressure area is at a pressure exceeding the normally low pressure exterior environment. This is brought about by the normally collapsed nature of the tubing forming elastomeric member 13 and the tendency of the pressure differential to maintain the normally collapsed state of elastomeric member 13. The embodiment just described prevents the leakage normally associated with prior art valve mechanisms and in the trucking industry alone saves significant labor and dollar expenditures associated with the maintenance required of valves which tolerate a small degree of leakage and which malfunction upon exposure to road soil.

Unexpected advantages of the structure of the FIG. 1 specie relate to the relationship of the structure and road soil. Head portion 19 of needle 17 while mating with distal end opening 14 not only provides a secondary means for preventing egress of fluid from the high pressure area but also prevents the ingress of road soil into the valve stem. A surprising advantage of this structure is that any road soil which enters the structure is swept through elastomer member 13 upon inflation. The FIG. 1 specie of this invention is not only less affected by road soil than the prior art valves but is also self cleaning. This structure thus eliminates the need for conventional end caps and circumvents the problems associated with the tendency of maintanance personnel to neglect replacement of end caps.

Figure 3:
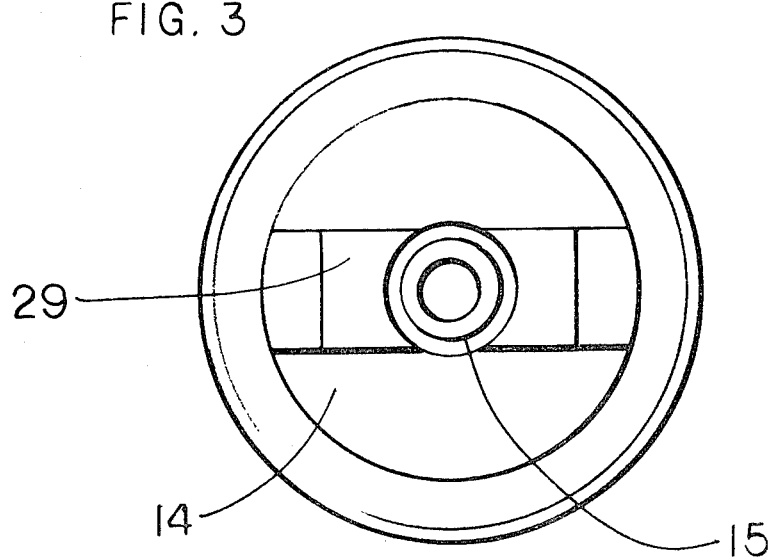
FIG. 3 of the drawings is an upper end view of the Fig. 1 view.

Various other features of a preferred nature are illustrated in the embodiment shown in FIG. 1. FIGS. 1 and 3 illustrate mechanical means 29 at the distal end 14 of core 3 for the removal of the core from the threads associated with the inner portion of stem 1.

Additionally, it will be noted that conventional stem 1 comprises a tapered section 31. It is contemplated that the material forming elastomeric member 13 in this embodiment not only provides a novel valve, but also seals core 3 by virtue of lodgement within the tapered section 31 to preclude leakage around the exterior of core 3.

Figure 4:
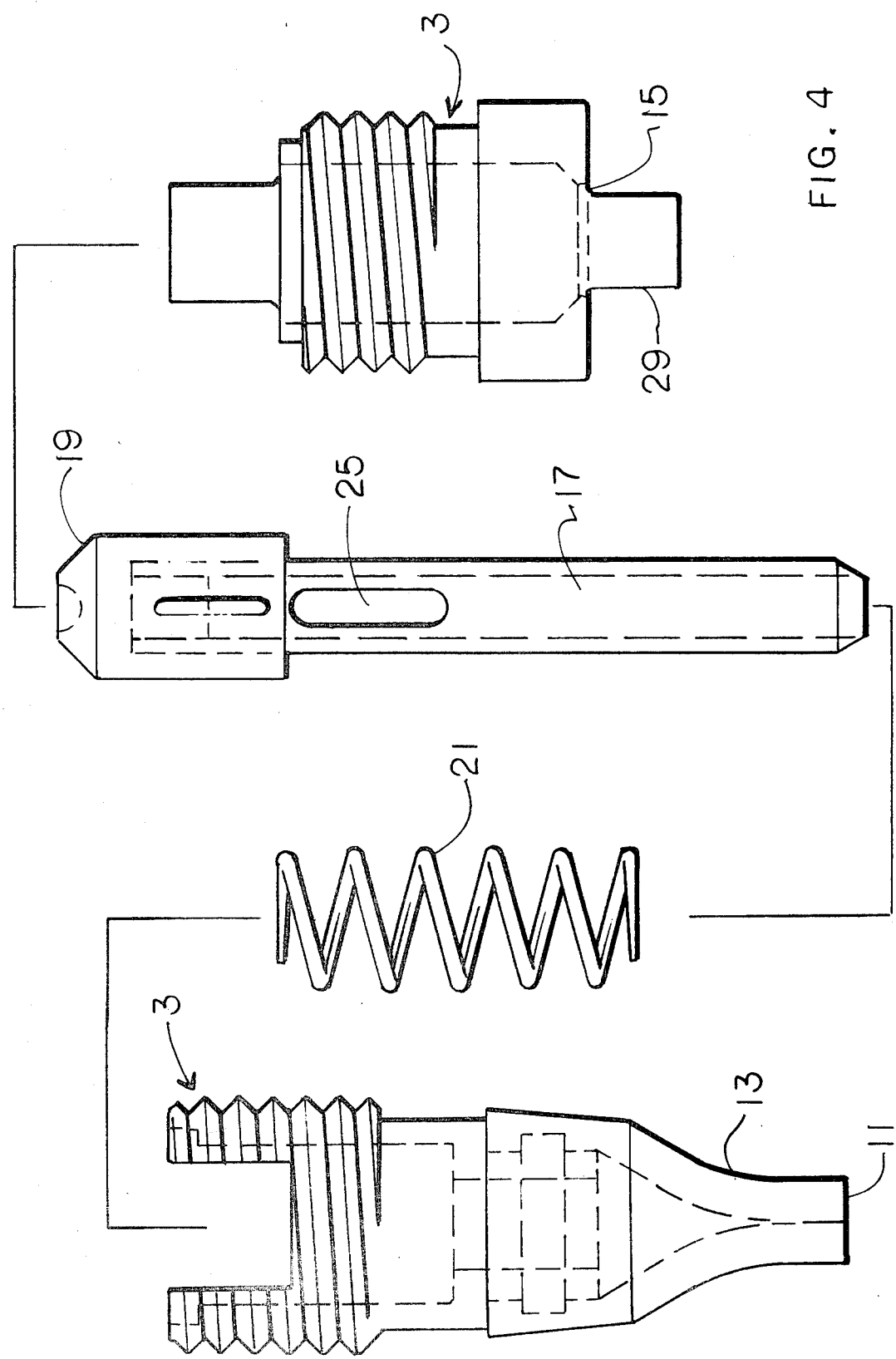
FIG. 4 of the drawings is an exploded view showing the assembly of the components illustrated in FIG. 1.

A juncture between upper and lower portions of core 3 is illustrated at 33 as a means for assembling the core 3 in accordance with this invention. An exploded assembly view of the FIG. 1 structure is shown in FIG. 4 of the drawings.

Figure 5:
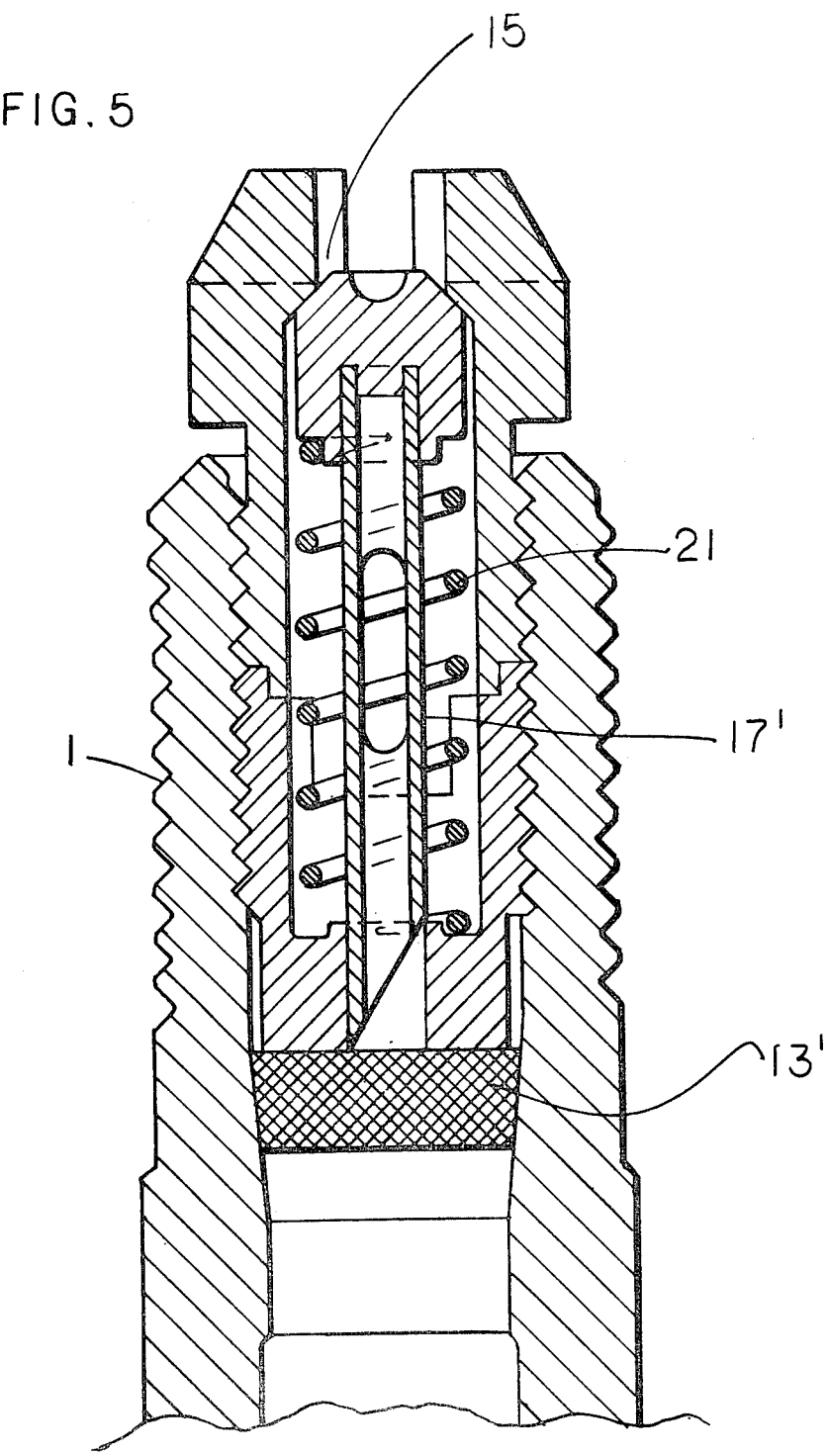
FIG. 5 of the drawings is a view similar to FIG. 1 of a second embodiment in accordance with this invention.
Figure 6:
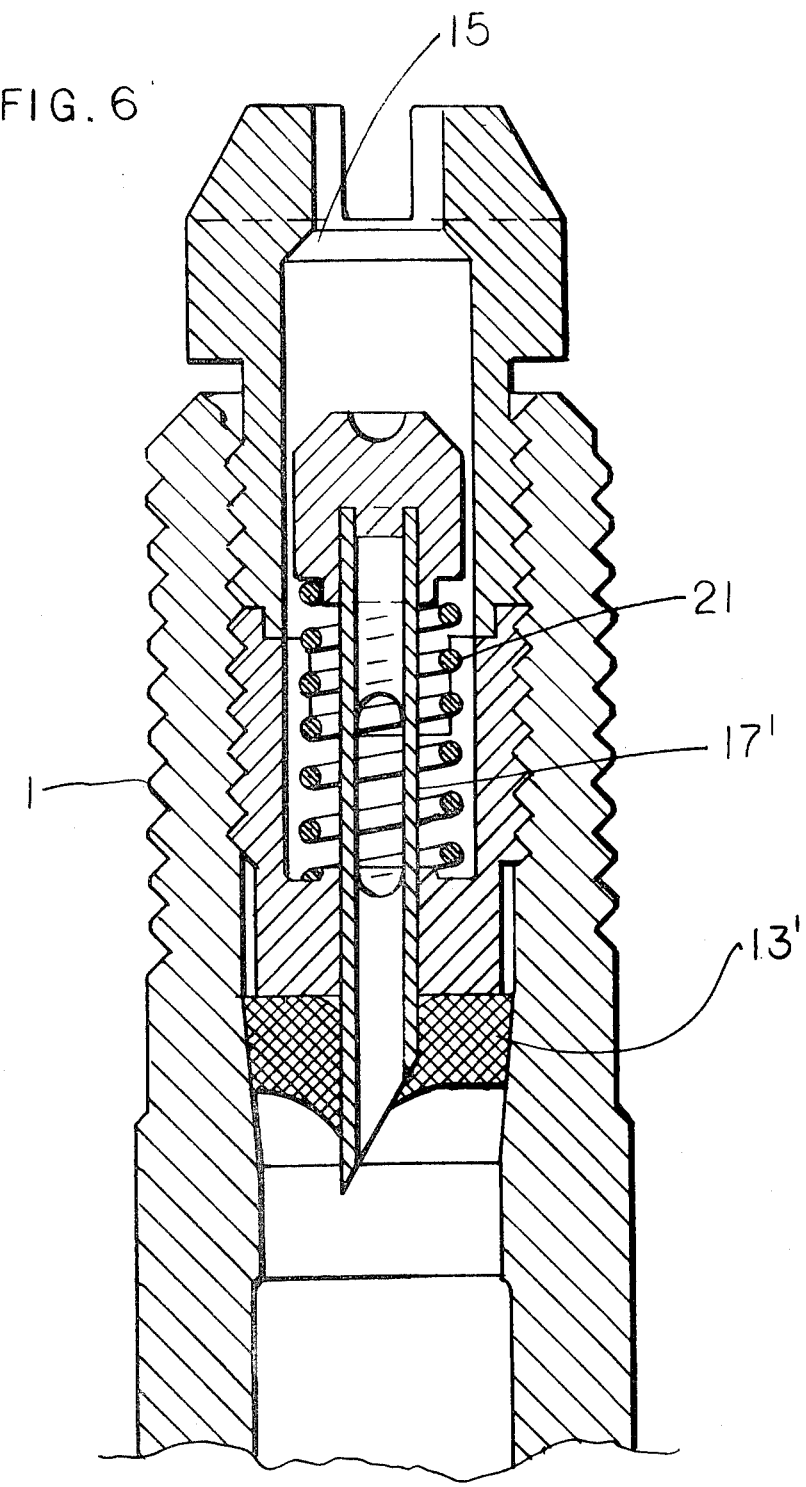
FIG. 6 of the drawings is a view similar to the FIG. 5 view illustrating differing component positions.

FIGS. 5 and 6 of the drawings illustrate a second specie within the generic invention of this invention. FIGS. 5 and 6 illustrate an elastomeric member which is referred to as 13'. The elastomeric member 13' is a resealable elastomeric material which permits sharpened needle 17' to penetrate for purposes of inflation or deflation, but which reseals itself upon removal of needle 17'. This is similar to materials normally associated with closed gas systems which permit hypodermic needle injection of desired gases into the closed system. An example of such a material is described in the above U.S. patents incorporated by reference.

FIG. 5 of the drawings illustrates needle 17' in the normally retracted position being biased by spring means 21 against distal end opening 15. FIG. 6 of the drawings, however, illustrates needle 17' penetrating elastomeric member 13' when it is displaced from its normal position for purposes of inflation or deflation. Upon retraction of needle 17' from penetration through elastomeric member 13', elastomeric member 13' reseals itself to prevent ingress and egress of atmosphere through stem 1. This assures virtually no leakage of fluid from the high pressure area through distal end opening 15.

It is thus seen that the core and valve stem embodying the core in accordance with this invention provides a novel valve arrangement which permits not only significantly less leakage from a vehicle tire than prior art structures, but also permits the elimination of the end cap normally associated with the terminal opening of conventional valve stems without permitting road soil to foul the operation of the novel valve according to this invention. The preceeding detailed description being highly exemplary in nature is not limiting of the spirit and scope of this invention as is defined by the following appended claims.

That which is claimed is:

1. A valve for separating a high pressure area from a low pressure area and providing selective fluid communication between said areas comprising;
    a hollow stem with the hollow portion thereof in fluid communication with said high pressure area at one end thereof and being capable of fluid communication with said low pressure area at the other end thereof;
    a hollow core within said hollow stem;
    said core having a proximal end and a distal end, said proximal end leading said core into said hollow stem and being located nearer said high pressure area than said distal end;
    said proximal end comprising a flexible tubular elastomeric member in a normally collapsed state to prevent fluid communication between said high pressure area and said low pressure area but penetrable to permit fluid communication with said high pressure area when said other end is in fluid communication with a source of pressurized fluid at a pressure equal to or greater than the pressure of said high pressure area and wherein said hollow core defines a distal end opening through the distal end thereof, said distal end opening normally being in fluid communication with said low pressure area;
    a needle movable positioned within the hollow of said core with a head portion defining a larger area than the area of said distal end opening said needle, being hollow and extending toward said elastomeric member but not contacting said elastomeric member unless moved toward said elastomeric member to penetrate and move through said elastomeric member against the normally collapsed state thereof; and
    means for resiliently urging said needle toward said distal end whereby said head portion normally blocks fluid and road soil communication between said low pressure area and said hollow of said core, said means for resiliently urging being permitting said needle and said head portion to be moved towards said high pressure area and through said elastomeric member to establish fluid communication between said high pressure area and said low pressure area for the inflation or deflation of said high pressure area through the hollow of said needle.

2. The valve according to claim 1 wherein said needle is hollow in areas other than said head portion and terminates in a hollow end portion, said hollow end portion being in fluid communication with said proximal end, said pin defining an orifice through the sides thereof to establish fluid communication between the hollow end portion thereof and said hollow of said core whereby when said pin is moved against the urging thereof away from a position blocking said distal end opening, fluid communication is achieved through said distal end opening through said orifice and through the hollow end portion of said pin to said proximal end of said core.

3. The valve in accordance with claim 1 wherein said core comprises mechanical means to remove said core from said hollow stem.

4. The valve in accordance with claim 2 wherein said means for resilient urging comprises a spring for biasing said needle toward said distal end.

5. The valve in accordance with claim 1 wherein said hollow stem is the valve stem to a vehicle tire and further comprising a pneumatic vehicle tire in communication therewith.

6. A core for a valve stem, comprising:
    a hollow central body portion having means on the outer portion thereof to engage the hollow inner area of a valve stem;
    a proximal end for leading said core into engagement with the inner walls of a valve stem;
    a distal end for trailing said core into a valve stem;
    said proximal end comprising and elastomeric member to normally prevent fluid communication between the hollow of said central body portion on one side elastomeric member and fluid on the other side thereof but being selectably penetrable to establish said communication and wherein said distal end defines a distal end opening therethrough, said distal end opening normally being in fluid communication with said low pressure area;
    a needle movable positioned within the hollow of said core with a head portion defining a larger area than the area of said distal end opening said needle, being hollow and extending toward said elastomeric member but not contacting said elastomeric member unless moved toward said elastomeric member to penetrate and move through said elastomeric member against the normally collapsed state thereof; and
    means for resiliently urging said needle toward said distal end whereby said head portion normally blocks fluid and road soil communication between said low pressure area and said hollow of said core, said means for resiliently urging being permitting said needle and said head portion to be moved towards said high pressure area and through said elastomeric member to establish fluid communication between said high pressure area and said low pressure area for the inflation or deflation of said high pressure area through the hollow of said needle.

7. The core according to claim 6 wherein said needle is hollow in areas other than said head portion and termination in a hollow end portion, said hollow end portion being in fluid communication with said proximal end, said pin defining an orifice through the sides thereof to establish fluid communication between the hollow end portion thereof and said hollow of said central body portion of said core whereby when said pin is moved against the biasing thereof away from a position blocking said distal end opening, fluid communication is achieved through said distal end opening through said orifice and through the hollow end portion of said pin to said proximal end of said core.

8. The core in accordance with claim 6 comprising mechanical means to remove said core from a valve stem.

9. The core in accordance with claim 6 wherein said means for resiliently urging comprises a spring for biasing said needle toward said distal end.

10. The core in accordance with claim 6 further including a valve stem for a pneumatic vehicle tire.

* * * * *